United States Patent
Takano

(10) Patent No.: US 8,319,614 B2
(45) Date of Patent: Nov. 27, 2012

(54) PARKING ASSISTANCE APPARATUS AND PARKING ASSISTANCE METHOD

(75) Inventor: Teruhisa Takano, Kawasaki (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 383 days.

(21) Appl. No.: 12/506,569

(22) Filed: Jul. 21, 2009

(65) Prior Publication Data

US 2010/0019934 A1 Jan. 28, 2010

(30) Foreign Application Priority Data

Jul. 25, 2008 (JP) ................. 2008-191958

(51) Int. Cl.
*H04B 3/36* (2006.01)
(52) U.S. Cl. .... 340/407.1; 340/506; 340/3.1; 340/573.1
(58) Field of Classification Search ............. 340/937, 340/932.2, 933, 435, 436; 348/143–170
See application file for complete search history.

(56) References Cited

U.S. PATENT DOCUMENTS

| | | | |
|---|---|---|---|
| 7,161,616 | B1 | 1/2007 | Okamoto et al. |
| 2006/0274147 | A1* | 12/2006 | Chinomi et al. ............. 348/118 |
| 2007/0057816 | A1 | 3/2007 | Sakakibara et al. |
| 2007/0273554 | A1 | 11/2007 | Sakakibara |
| 2008/0077294 | A1 | 3/2008 | Danz et al. |
| 2008/0136673 | A1 | 6/2008 | Jung |
| 2008/0174452 | A1 | 7/2008 | Yamamoto et al. |
| 2009/0143967 | A1 | 6/2009 | Lee et al. |
| 2010/0274474 | A1 | 10/2010 | Takano |
| 2011/0095910 | A1 | 4/2011 | Takano |

FOREIGN PATENT DOCUMENTS

| | | |
|---|---|---|
| CN | 1964883 A | 5/2007 |
| EP | 1 038 734 A1 | 9/2000 |
| EP | 1 102 226 B1 | 7/2005 |
| EP | 1 862 376 A2 | 12/2007 |
| EP | 1 916 846 A1 | 4/2008 |
| JP | 2002-240662 A | 8/2002 |
| JP | 2005-239048 A | 9/2005 |
| JP | 2005-329915 A | 12/2005 |

(Continued)

OTHER PUBLICATIONS

Takano, US PTO Non-Final Office Action, U.S. Appl. No. 12/810,258, dated Aug. 6, 2012, 13 pgs.

*Primary Examiner* — Daryl Pope
(74) *Attorney, Agent, or Firm* — Foley & Lardner LLP

(57) ABSTRACT

A target parking position serving as a parking target of a vehicle is set, and a parking start position from which the vehicle can start to reach the target parking position while maintaining a predetermined steering angle is set. Then, a vehicle mark V indicating a current position, a target parking frame F1 indicating the target parking position, and a parking start frame F2 indicating the parking start position are drawn on a bird's eye image of a periphery of the vehicle, and a display device 5 is allowed to display an image in which the vehicle mark V, the target parking frame F1 and the parking start frame F2 are drawn on the bird's eye image. At this time, the parking start frame F2 is drawn on the bird's eye image so that a drawing mode thereof can be changed in response to a current steering angle of the vehicle.

13 Claims, 9 Drawing Sheets

FOREIGN PATENT DOCUMENTS

| | | |
|---|---|---|
| JP | 2006-312440 A | 11/2006 |
| JP | 2007-118922 A | 5/2007 |
| JP | 2007-230371 A | 9/2007 |
| JP | 2008-044529 A | 2/2008 |
| JP | 2008-114776 A | 5/2008 |
| JP | 2009-143410 A | 7/2009 |
| WO | WO 2005/120932 A1 | 12/2005 |
| WO | WO 2006/100892 A1 | 9/2006 |
| WO | WO 2007/015446 A1 | 2/2007 |
| WO | WO 2009/081519 A1 | 7/2009 |

* cited by examiner

PARKING START POSITION BEFORE BEING RESET
PARKING START POSITION AFTER BEING RESET
TARGET PARKING POSITION BEFORE BEING RESET
TARGET PARKING POSITION AFTER BEING RESET

PARKING ASSISTANCE APPARATUS AND PARKING ASSISTANCE METHOD

BACKGROUND OF THE INVENTION

The present invention relates to a parking assistance apparatus and a parking assistance method, which assist a driving operation of a driver at the time when the driver parks a vehicle.

Heretofore, as a parking assistance apparatus that assists a driving operation when a vehicle is parked, such an apparatus as disclosed in Japanese Patent Laid-Open Publication No. 2005-239048 has been known. This conventional parking assistance apparatus synthesizes images around the vehicle, which are taken by a plurality of on-board cameras, to thereby create a bird's eye image, draws a graphic form of the vehicle at a position of the vehicle on this bird's eye image, draws a parking frame at a target parking position set by a driver of the vehicle, and displays the graphic form of the vehicle and the parking frame on a display device, thereby allows the driver of the vehicle to easily grasp a course from the current position of the vehicle to the target parking position.

SUMMARY OF THE INVENTION

However, in accordance with such a conventional technology, the driver of the vehicle is allowed to only recognize the course from the current position of the vehicle to the target parking position, and it is not clear to the driver where to start a parking operation to reach the target parking position without performing a steering operation. Accordingly, this conventional technology has been insufficient as assistance of a driving operation particularly for a driver who is not accustomed to the driving.

The present invention has been created in consideration for such conventional actual circumstances as described above. It is an object of the present invention to provide a parking assistance apparatus and a parking assistance method, which are capable of appropriately assisting the driving operation when the vehicle is parked so as to allow the driver who is unaccustomed to the driving to easily park the vehicle.

A parking assistance apparatus according to the present invention includes: a plurality of on-board cameras which take images around a vehicle; a bird's eye image creation unit that synthesizes a plurality of the images taken by the plurality of on-board cameras to thereby create a bird's eye image looking down on the vehicle from above the vehicle; and a display device that displays the created bird's eye image, a target parking frame corresponding to a target parking position, and a parking start frame corresponding to a parking start position of a time when the vehicle is parked at the target parking position. Then, a display position and drawing mode of the parking start frame displayed on the display device are changed in response to a change of a steering angle of the vehicle.

DETAILED DESCRIPTION OF THE PREFERRED EMBODIMENTS

Figure 1:
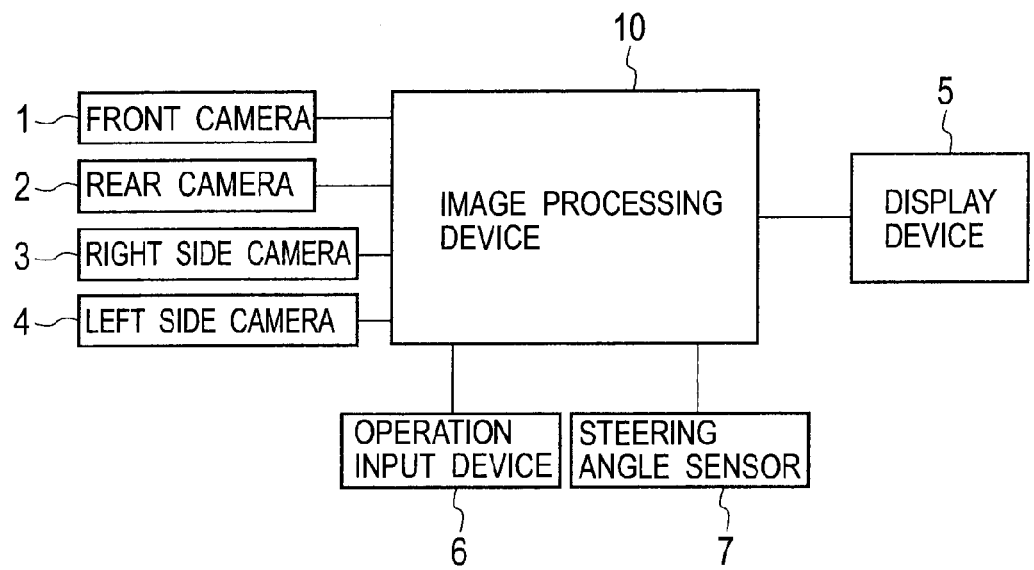
FIG. 1 is a block diagram showing a schematic configuration of a parking assistance apparatus.

A description will be made below in detail of specific embodiments of the present invention while referring to the drawings.

First Embodiment

FIG. 1 is a block diagram showing a schematic configuration of a parking assistance apparatus to which the present invention is applied. The parking assistance apparatus of this embodiment is an apparatus that assists a driving operation at the time when a driver parks the vehicle while displaying a bird's eye image around a vehicle. As shown in FIG. 1, the parking assistance apparatus has a configuration in which four on-board cameras mounted on the vehicle, which are a front camera 1, a rear camera 2, a right side camera 3 and a left side camera 4, are connected to an input side of an image processing device 10, and a display device 5, such as a liquid crystal display, placed in a vehicle cabin of the vehicle is connected to an output side of the image processing device 10. Moreover, to the image processing device 10, there are individually connected an operation input device 6 that receives an operation input by the driver of the vehicle, and a steering angle sensor 7 that senses a steering angle of the vehicle. Note that a touch panel type screen may be provided on the display device 5, and the operation input by the driver of the vehicle may be performed from such a touch panel of the display device 5.

Figure 2:
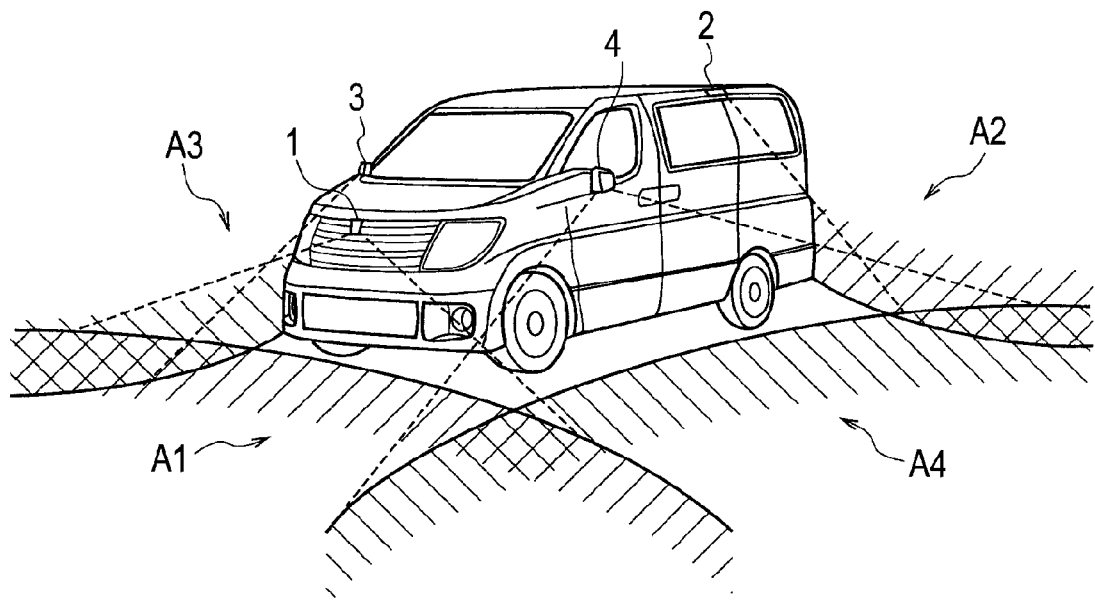
FIG. 2 is a view explaining attached positions of four on-board cameras and areas imaged by the respective on-board cameras.

The four on-board cameras, which are the front camera 1, the rear camera 2, the right side camera 3 and the left side camera 4, are composed of wide-angle CCD or CMOS cameras, each of which has an angle of view, for example, of approximately 180 degrees. These four on-board cameras 1 to 4 are mounted on appropriate spots of the vehicle so as to be capable of taking images of the entire area surrounding the vehicle. Specifically, as shown in FIG. 2, the front camera 1 is placed on a front grill of the vehicle, and takes an image of an area A1 forward of the vehicle in a direction of looking obliquely down on the ground. Moreover, the rear camera 2 is placed on a roof spoiler of the vehicle, and takes an image of an area A2 rearward of the vehicle in a direction of looking obliquely down on the ground. Moreover, the right side camera 3 is placed on a right side mirror of the vehicle, and takes an image of an area A3 rightward of the vehicle in a direction of looking obliquely down on the ground. Furthermore, the left side camera 4 is placed on a left side mirror of the vehicle, and takes an image of an area A4 leftward of the vehicle in a direction of looking obliquely down on the ground. Each of these four on-board cameras 1 to 4 converts the taken image into an image signal, and outputs the image signal to the image processing device 10.

Figure 3:
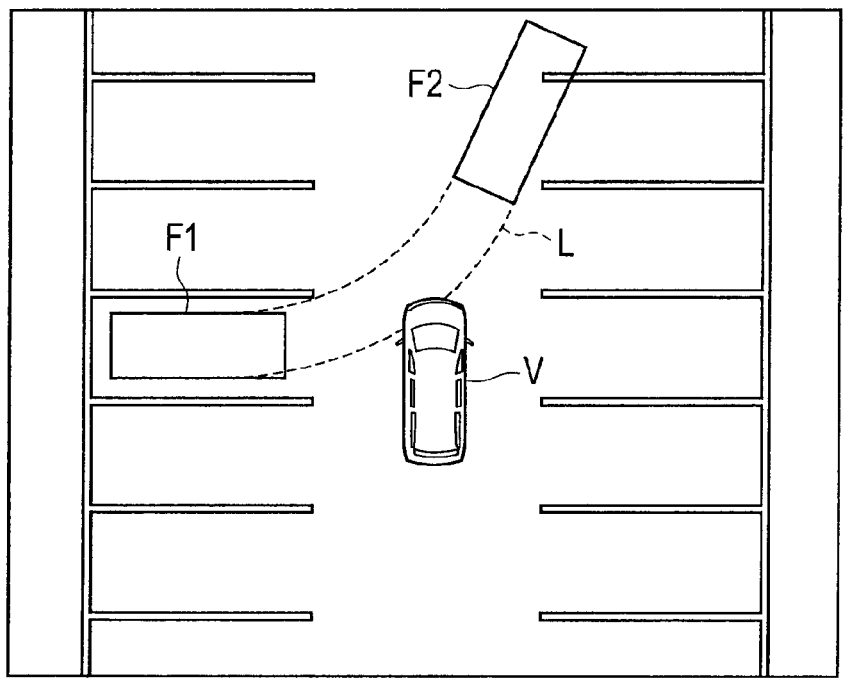
FIG. 3 is a view showing an example of an image displayed on a display device.
Figure 4:
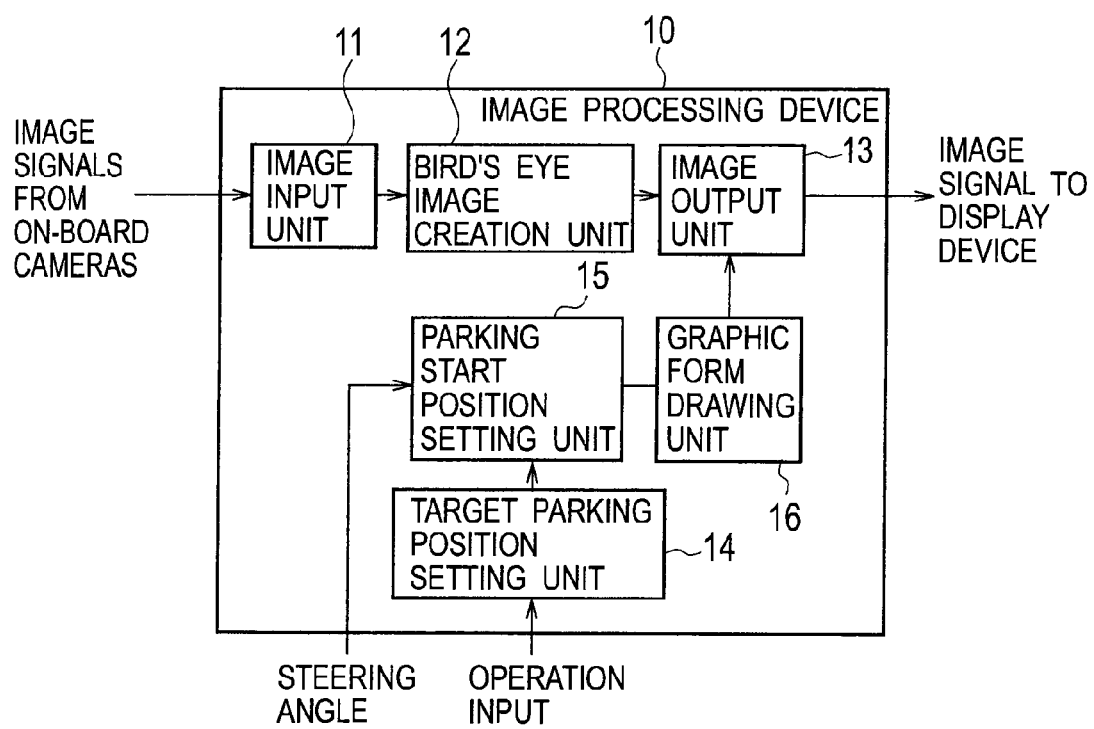
FIG. 4 is a block diagram showing a functional configuration of an image processing device.

The image processing device 10 is composed by including a microcomputer, frame memories and the like, which operate in accordance with a predetermined processing program. The image processing device 10 allows a CPU of the microcomputer to execute the processing program, thereby creates an image as shown in FIG. 3, which is for assisting the driving operation at the time when the driver parks the vehicle, and then allows the display device 5 to display the created image. When the configuration of the image processing device 10 is viewed in terms of functions, as shown in FIG. 4, the configuration includes an image input unit 11, a bird's eye image creation unit 12, an image output unit 13, a target parking position setting unit 14, a parking start position setting unit 15, and a graphic form drawing unit 16. Note that the image processing device 10 may also be composed by using an application specific integrated circuit (ASIC), a field programmable gate array (FPGA) or the like, which incorporates therein the respective processing functions as a circuit, in place of the microcomputer.

The images taken by the four on-board cameras which are the front camera 1, the rear camera 2, the right side camera 3 and the left side camera 4 are inputted to the image input unit 11 of the image processing device 10. In the image input unit 11, the frame memories corresponding to the respective on-board cameras 1 to 4 are provided, and the image signals from these four on-board cameras 1 to 4 are subjected to A/D conversion, and are thereafter stored whenever necessary in the frame memories corresponding thereto for each data unit composing one image frame.

The bird's eye image creation unit 12 performs viewpoint conversion for the images taken by the four on-board cameras 1 to 4, which are stored in the frame memories of the image input unit 11, individually into bird's eye images in accordance with a predetermined coordinate conversion algorithm, and connects the bird's eye images obtained by performing the viewpoint conversion for the images taken by these four on-board cameras 1 to 4 to one another, thereby creates a bird's eye image looking down on the entire periphery of the vehicle as a center from a virtual viewpoint above the vehicle. Such creation of the bird's eye image by the bird's eye image creation unit 12 is repeatedly performed for each predetermined cycle (for example, imaging cycle of the on-board cameras 1 to 4), and image data thereof is outputted to the image output unit 13.

In the image output unit 13, a frame memory is provided, that temporarily stores the image which the display device 5 is allowed to display, and the image data of the bird's eye image created by the bird's eye image creation unit 12 is stored in this frame memory whenever necessary. Then, for the bird's eye image stored in the frame memory, as will be described later in detail, a variety of graphic forms such as a vehicle mark V, a target parking frame F1, a parking start frame F2 and a parking path L are drawn by the graphic form drawing unit 16, and the image data subjected to such a process is subjected to the D/A conversion, and is outputted to the display device 5 whenever necessary. In such a way, the image as shown in FIG. 3 is displayed as a moving picture on the display device 5 while being updated whenever necessary.

The target parking position setting unit 14 sets a target parking position serving as a parking target of the vehicle on an area around a current position of the vehicle, for example, in accordance with an operation input using the operation input device 6, which is made by the driver of the vehicle. Moreover, the target parking position setting unit 14 may analyze the bird's eye image created by the bird's eye image creation unit 12, thereby may detect a parking possible space, in which the vehicle can be parked, around the current position of the vehicle, and may set the detected parking possible space as the target parking position.

Based on information on a current steering angle of the vehicle, which is sensed by the steering angle sensor 7, and on a position information on the target parking position set by the target parking position setting unit 14, the parking start position setting unit 15 sets a parking start position that is a position from which the vehicle can start to reach the target parking position while maintaining a predetermined steering angle thereof. Here, the parking start position is set on a course when the vehicle travels while maintaining the current steering angle thereof. In short, the parking start position is a position from which the vehicle can reach the target parking position while maintaining the steering angle if the vehicle starts the parking movement from the position concerned.

Figure 5:
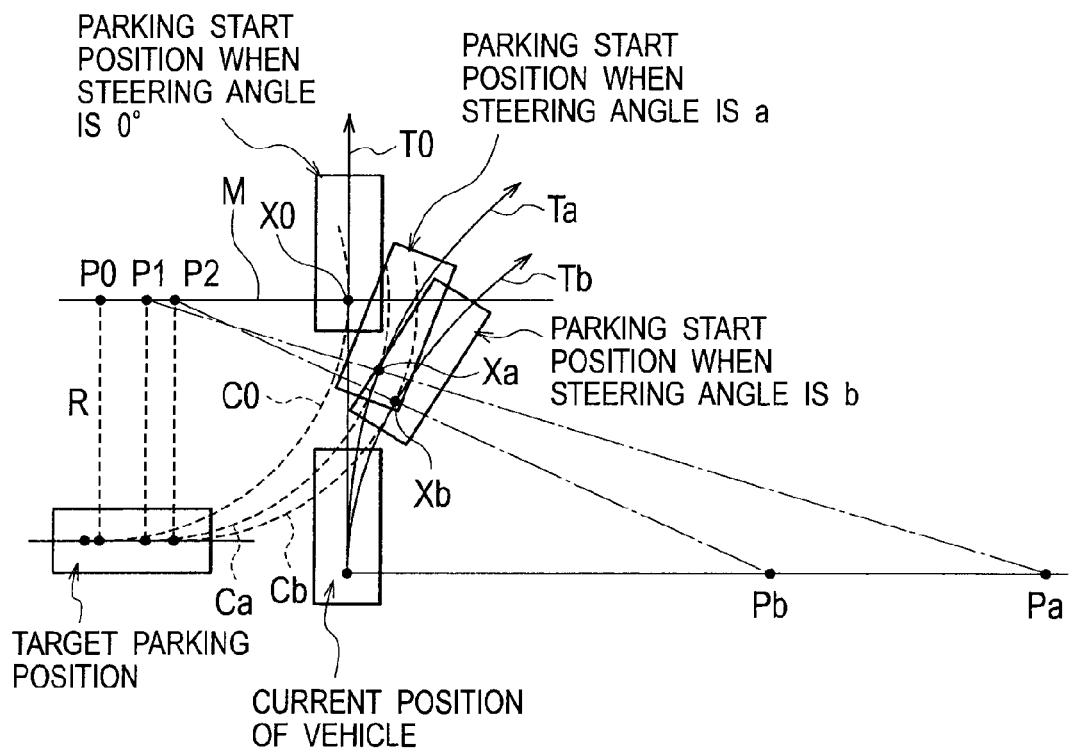
FIG. 5 is a view explaining an example of a method of setting a parking start position.

FIG. 5 is a view explaining an example of a method of setting the parking start position by the parking start position setting unit 15. Note that a description will be made here of, taken as an example, the case of setting a parking start position from which the vehicle can reach a target parking position set in an orientation perpendicular to an orientation of the vehicle in such a manner that the driver fully steers the vehicle sideward of the current position thereof, that is, maintains the steering angle in a maximum steerable angle in the right direction or the left direction.

First, based on the information on the current steering angle of the vehicle, which is sensed by the steering angle sensor 7, the parking start position setting unit 15 obtains a course in the case where the vehicle travels from the current position while maintaining the current steering angle. In FIG. 5, reference symbol T0 denotes a course when the current steering angle of the vehicle is 0° (neutral state), reference symbol Ta denotes a course when the steering angle is a, and reference symbol Tb denotes a course when the steering angle is b. Note that, in this example shown in FIG. 5, an intermediate position between right and left rear wheels of the vehicle is defined as a reference point, and a track through which the reference point passes is calculated as the course of the vehicle; however, a track of an inner wheel side of the vehicle may be calculated as the course of the vehicle, or a band-like track corresponding to a width of the vehicle may be calculated as the course of the vehicle.

Next, the parking start position setting unit 15 obtains a straight line M that is parallel to a longitudinal orientation of the target parking position and is apart from the target parking position by a distance equivalent to a radius of rotation R in the case where the vehicle turns while making a full steering angle thereof. Then, the parking start position setting unit 15 obtains a circular arc that has the radius R having a center thereof on the straight line M and is in contact with a course corresponding to the current steering angle of the vehicle. In FIG. 5, reference symbol C0 denotes a circular arc with the radius R, which defines a point P0 on the straight line M to be a center thereof, and is in contact with a track T0 when the current steering angle is 0°, reference symbol Ca denotes a circular arc with the radius R, which defines a point P1 on the straight line M to be a center thereof, and is in contact with a track Ta when the current steering angle is a, and reference symbol Cb denotes a circular arc with the radius R, which defines a point P2 on the straight line M to be a center thereof, and is in contact with a track Tb when the current steering angle is b. Note that the point P1 is an intersection point of the straight line M and a straight line that connects a center of rotation Pa when the steering angle is a and a point of contact of the circular arc Ca and the track Ta to each other. Moreover, the point P2 is an intersection point of the straight line M and a straight line that connects a center of rotation Pb when the steering angle is b and a point of contact of the circular arc Cb and the track Tb to each other.

Then, the parking start position setting unit 15 defines a position of the point of contact of the circular arc obtained as described above and the course corresponding to the current steering angle as a reference point of the parking start position from which the vehicle can start to reach the target parking position while making the full steering angle. Then, the parking start position setting unit 15 sets an area with a shape of the vehicle, which goes along a direction of a tangential line at this reference point, as the parking start position. In FIG. 5, reference symbol X0 denotes a reference point of the parking start position when the current steering angle is 0°, reference symbol Xa denotes a reference point of the parking start position when the current steering angle is a, and reference symbol Xb denotes a reference point of the parking start position when the current steering angle is b.

The parking start position set as described above by the parking start position setting unit 15 indicates a position from which the vehicle can be parked at the target parking position while maintaining the steering angle at the predetermined angle in such a manner that a parking operation is started therefrom to the target parking position. Specifically, in the case where the current steering angle of the vehicle is 0°, the vehicle is allowed to travel along the course T0 while maintaining the current steering angle 0°, and when the vehicle reaches the parking start position with the reference point of X0, then shift change is performed, the full steering angle is made, and the vehicle is allowed to travel toward the target parking position while keeping on making the full steering angle. Then, the vehicle can be appropriately parked at the target parking position. Moreover, in the case where the current steering angle of the vehicle is a, the vehicle is allowed to travel along the course Ta while maintaining the current steering angle a, and when the vehicle reaches the parking start position with the reference point of Xa, then the shift change is performed, the full steering angle is made, and the vehicle is allowed to travel toward the target parking position while keeping on making the full steering angle. Then, the vehicle can be appropriately parked at the target parking position. Furthermore, in the case where the current steering angle of the vehicle is b, the vehicle is allowed to travel along the course Tb while maintaining the current steering angle b, and when the vehicle reaches the parking start position with the reference point of Xb, then the shift change is performed, the full steering angle is made, and the vehicle is allowed to travel toward the target parking position while keeping on making the full steering angle. Then, the vehicle can be appropriately parked at the target parking position.

On the bird's eye image created by the bird's eye image creation unit 12, the graphic form drawing unit 16 draws the vehicle mark V indicating the current position of the vehicle, the target parking frame F1 indicating the target parking position set by the target parking position setting unit 14, the parking start frame F2 indicating the parking start position set by the parking start position setting unit 15, and the parking path L indicating a path from the parking start position to the target parking position at the time of the parking operation.

Specifically, the graphic form drawing unit 16 holds a computer graphic image of a vehicle, of which size is equivalent to that of the vehicle on the bird's eye image, and when the bird's eye image is created by the bird's eye image creation unit 12, draws this computer graphic image as the vehicle mark V on a center position of the created bird's eye image. Moreover, when the target parking position is set by the target parking position setting unit 14, the graphic form drawing unit 16 draws, as the target parking frame F1, a rectangular frame, of which size is equivalent to that of the vehicle on the bird's eye image created by the bird's eye image creation unit 12, on a coordinate position corresponding to the target parking position on the bird's eye image. Furthermore, when the parking start position is set by the parking start position setting unit 15, the graphic form drawing unit 16 draws, as the parking start frame F2, a rectangular frame, of which size is equivalent to that of the vehicle on the bird's eye image created by the bird's eye image creation unit 12, on a coordinate position corresponding to the parking start position on the bird's eye image, and further, draws, as the parking path L, a track through which the vehicle passes from the parking start position to the target parking position at the predetermined steering angle.

Here, as described above, the parking start position set by the parking start position setting unit 15 is calculated in response to the current steering angle of the vehicle, and accordingly, when the steering angle is changed by a steering operation of the driver of the vehicle, the position of the parking start frame F2 drawn by the graphic form drawing unit 16 on the bird's eye image will also be changed. For example, in the example shown in FIG. 5, when the steering angle is changed from 0° (neutral state) to a, the position on which the parking start frame F2 is drawn on the bird's eye image is smoothly changed from the position with the reference point of X0 to the position with the reference point of Xa, and when the steering angle is changed from a to b, the position on which the parking start frame F2 is drawn on the bird's eye image is smoothly changed from the position with the reference point of Xa to the position with the reference point of Xb.

Moreover, at the time when the graphic form drawing unit 16 draws the parking start frame F2 on the bird's eye image, particularly in this embodiment, in order that the driver of the vehicle can grasp the optimum parking start position at a glance, a drawing mode (for example, a drawing color) of the parking start frame F2 drawn on the bird's eye image is changed in response to the current steering angle of the vehicle, more specifically, in response to a recommended degree of the parking start position, which is set based on the current steering angle of the vehicle.

Figure 6:
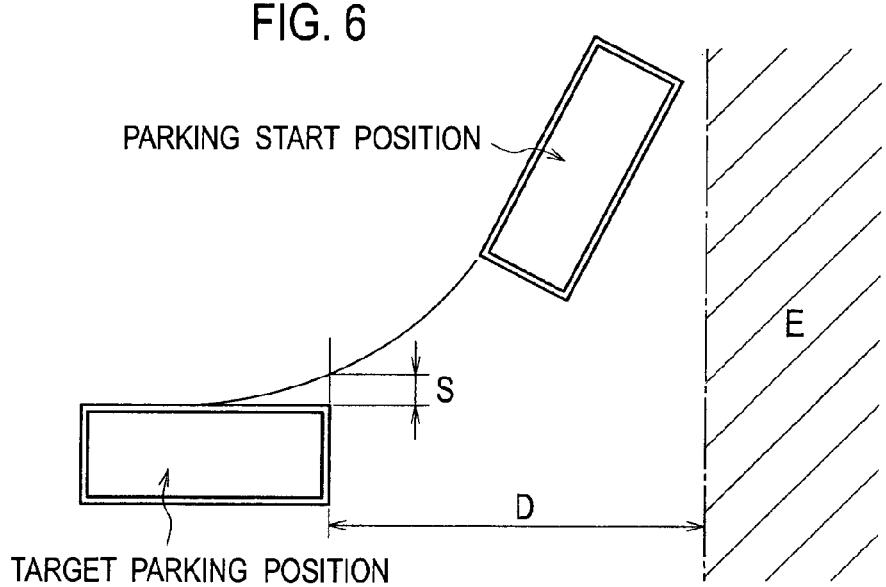
FIG. 6 is a view explaining a specific example of a method of deciding a drawing mode of a parking start frame.

FIG. 6 is a view explaining a specific example of a method of deciding the drawing mode of the parking start frame F2. For example as shown in FIG. 6, the graphic form drawing unit 16 obtains an entanglement amount S in a width direction of the target parking position along the path (parking path L) from the set parking start position to the target parking position, and determines whether or not this entanglement amount S becomes a predetermined amount or less. Here, the entanglement amount S represents a maximum apart distance between a track of an innermost turning circumference of the vehicle when the vehicle reaches the target parking position and an end portion of the target parking position in the width direction. Moreover, the predetermined value serving as a reference of the determination is set based on a general apart distance to a parked vehicle in the case of assuming that the parked vehicle is present in a parking space adjacent to the target parking position. For example, the predetermined value is set at approximately 0.5 m.

Moreover, the graphic form drawing unit 16 determines whether or not the set parking start position interferes with an area E apart from the target parking position in a longitudinal direction thereof by a predetermined distance D or more. Here, the predetermined distance D is set based on a passage width in a general parking lot, and for example, is set at approximately 4 m.

Then, in the case where the parking start position is set at a position at which the entanglement amount S along the path to the target parking position becomes the predetermined value or less, and that does not interfere with the area E apart from the target parking position in the longitudinal direction by the predetermined distance D or more, the graphic form drawing unit 16 draws the parking start frame F2 indicating the parking start position, for example, by green (first drawing color). Meanwhile, in the case where the parking start position is set at a position at which the entanglement amount S along the path to the target parking position exceeds the predetermined value or at a position that interferes with the area E apart from the target parking position in the longitudinal direction by the predetermined distance D or more, the graphic form drawing unit 16 draws the parking start frame F2 indicating the parking start position, for example, by yellow (second drawing color).

For example, in the example shown in FIG. 5, the following cases are assumed. When the steering angle is 0°, the parking start position does not interfere with the area E, but the entanglement amount S along the path therefrom exceeds the predetermined value. Moreover, when the steering angle is b, the entanglement amount S along the path from the parking start position becomes the predetermined value or less, but the parking start position interferes with the area E. Furthermore, when the steering angle is a, the entanglement amount S along the path from the parking position becomes the predetermined value or less, and the parking start position does not interfere with the area E. Then, the parking start frame F2 indicating the parking start position when the steering angle is a is drawn by green, and the parking start frame F2 indicating the parking start position when the steering angle is 0° and the parking start frame F2 indicating the parking start position when the steering angle is b are drawn by yellow. Note that the parking start frame F2 drawn by green indicates a most recommended parking start position as a position from which the parking to the target parking position is started, and the parking start frames F2 drawn by yellow indicate parking start positions from which it is necessary to perform the parking operation while confirming surrounding circumstances.

Figure 7:
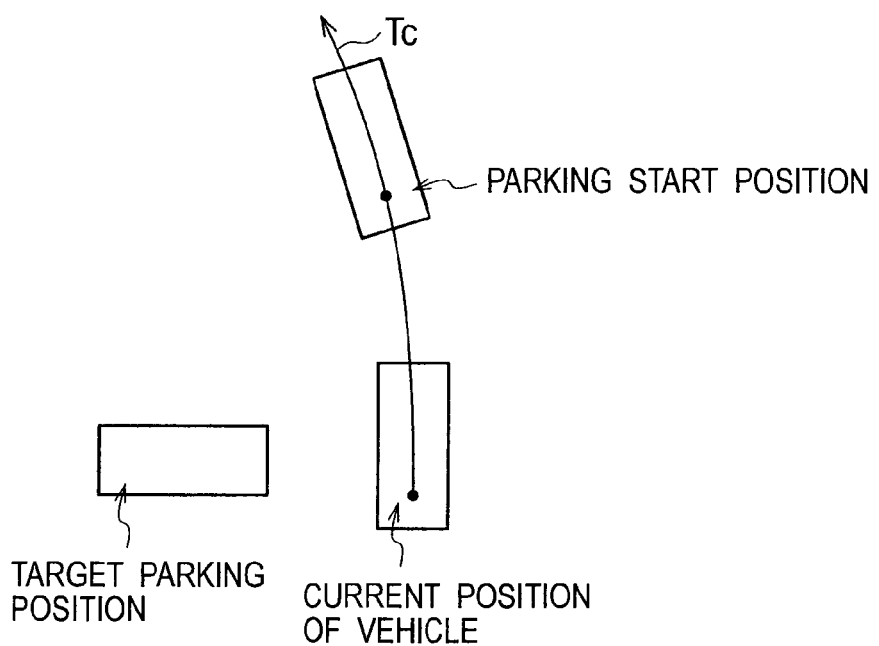
FIG. 7 is a view explaining a specific example of the method of deciding the drawing mode of the parking start frame.

Moreover, in the case where the current steering angle of the vehicle is a steering angle in a direction of approaching the target parking position with respect to the neutral angle, and for example as shown in FIG. 7, the parking start position is set on a course Tc in the direction of approaching the target parking position, then the graphic form drawing unit 16 draws the parking start frame F2 indicating the parking start position concerned, for example, by red (third drawing color). The parking start frame F2 drawn by red indicates a parking start position required to be changed since it becomes difficult to appropriately move the vehicle therefrom to the target parking position.

In the parking assistance apparatus of this embodiment, as described above, the image in which the variety of graphic forms such as the vehicle mark V, the target parking frame F1, the parking start frame F2 and the parking path L are drawn by the graphic form drawing unit 16 on the bird's eye image created by the bird's eye image creation unit 12 is displayed as the moving picture on the display device 5. Hence, the driver of the vehicle sees the image displayed on the display device 5, thereby can recognize the parking start position from which the vehicle can reach the target parking position while maintaining the predetermined steering angle (for example, making the full steering angle), and becomes capable of extremely simply performing the driving operation at the time of parking the vehicle. In particular, the parking start frame F2 indicating the parking start position is displayed so that the position thereof can be changed on the bird's eye image in response to the change of the steering angle made by the steering operation of the driver of the vehicle, and further, so that the color thereof can be changed in response to the recommended degree thereof. Accordingly, the driver of the vehicle moves the parking start frame F2 on the bird's eye image while performing the steering operation to confirm the change of the color, and thereby can recognize the optimum parking start position easily.

Incidentally, since the parking start frame F2 on the bird's eye image is a frame for allowing the driver of the vehicle to recognize the parking start position corresponding to the current steering angle, it becomes unnecessary to display the parking start frame F2 when the vehicle reaches the parking start position. Meanwhile, when the vehicle reaches the parking start position, it is necessary for the driver of the vehicle to change the steering angle to the predetermined angle (for example, full steering angle) by performing the steering operation, and accordingly, it is desired that the driver of the vehicle be allowed to recognize a direction of the steering operation.

Figure 8:
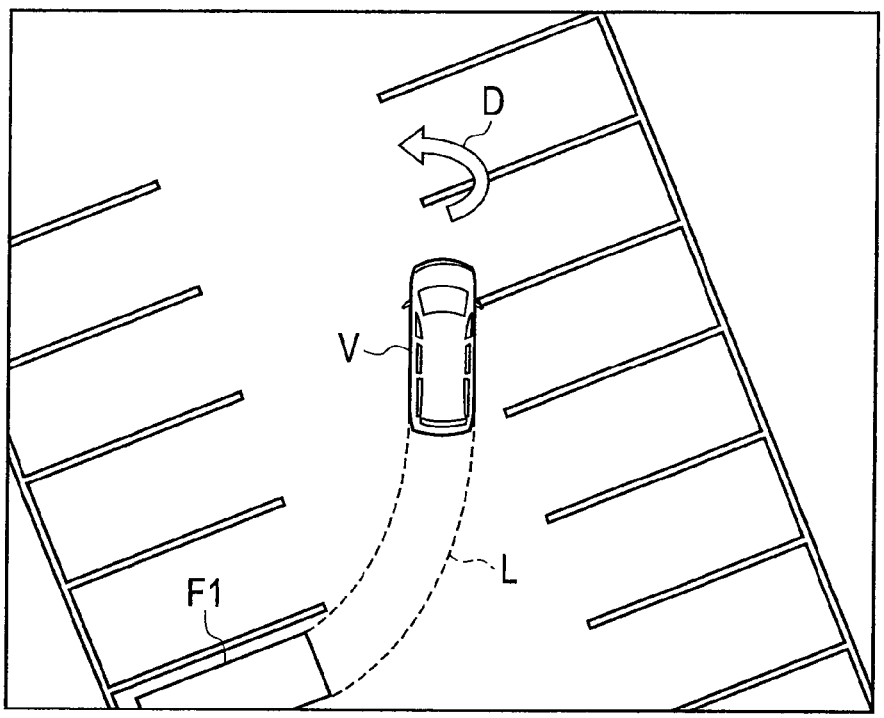
FIG. 8 is a view showing an example of an image displayed on the display device when a vehicle reaches the parking start position.

In this connection, in the parking assistance apparatus of this embodiment, in the image processing device 10, for example, it is determined whether on not the position of the vehicle and the parking start position coincide with each other on the bird's eye image, and so on, whereby it is determined whether or not the vehicle has reached the parking start position. Then, when the vehicle has reached the parking start position, the graphic form drawing unit 16 finishes drawing the parking start frame F2, and draws, on the bird's eye image, a direction indicating icon D that indicates the direction of the steering operation for changing the steering angle to the predetermined angle, thereby allows the display device 5 to display such an image, for example, as shown in FIG. 8.

Specifically, when the vehicle has reached the parking start position, the graphic form drawing unit 16 obtains a direction of a required steering operation based on a relationship between the current steering angle of the vehicle, which is sensed by the steering angle sensor 7, and the predetermined steering angle of the time when the vehicle moves to the target parking position. Then, the graphic form drawing unit 16 draws, as the direction indicating icon D, a graphic form of an arrow corresponding to the obtained direction of the steering operation in the vicinity of the vehicle mark V on the bird's eye image. Moreover, during a period while drawing the direction indicating icon D on the bird's eye image, the graphic form drawing unit 16 monitors the steering angle of the vehicle, which is sensed by the steering angle sensor 7. At the time of determining that, by the steering operation by the driver of the vehicle, the current steering angle of the vehicle has coincided with the predetermined steering angle of the time when the vehicle moves from the parking start position to the target parking position, the graphic form drawing unit 16 finishes drawing the direction indicating icon D.

Figure 9:
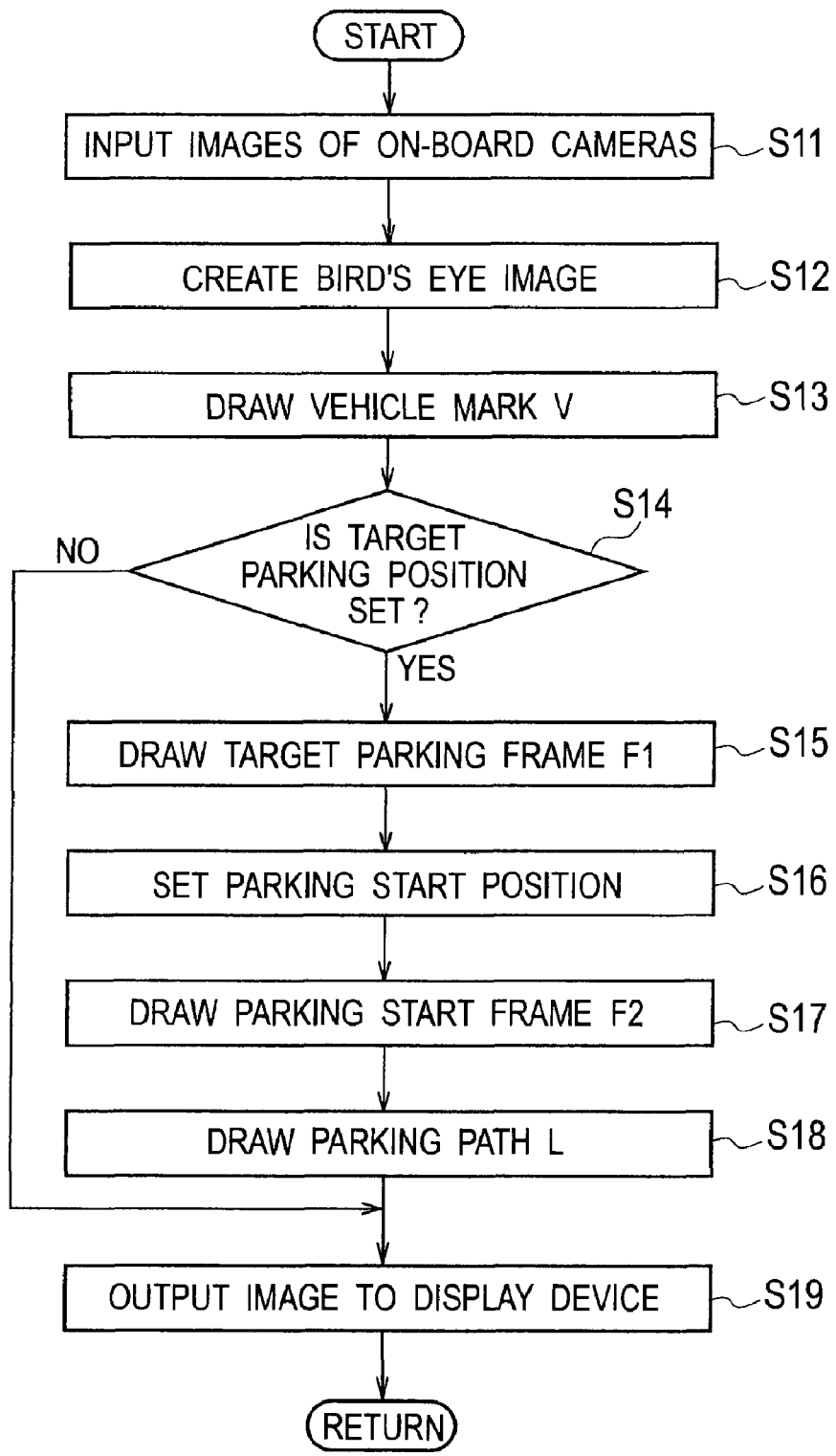
FIG. 9 is a flowchart showing a flow of a series of processing steps executed by the image processing device for each predetermined cycle during a period from when the parking assistance apparatus is activated to when the vehicle reaches the parking start position.
Figure 10:
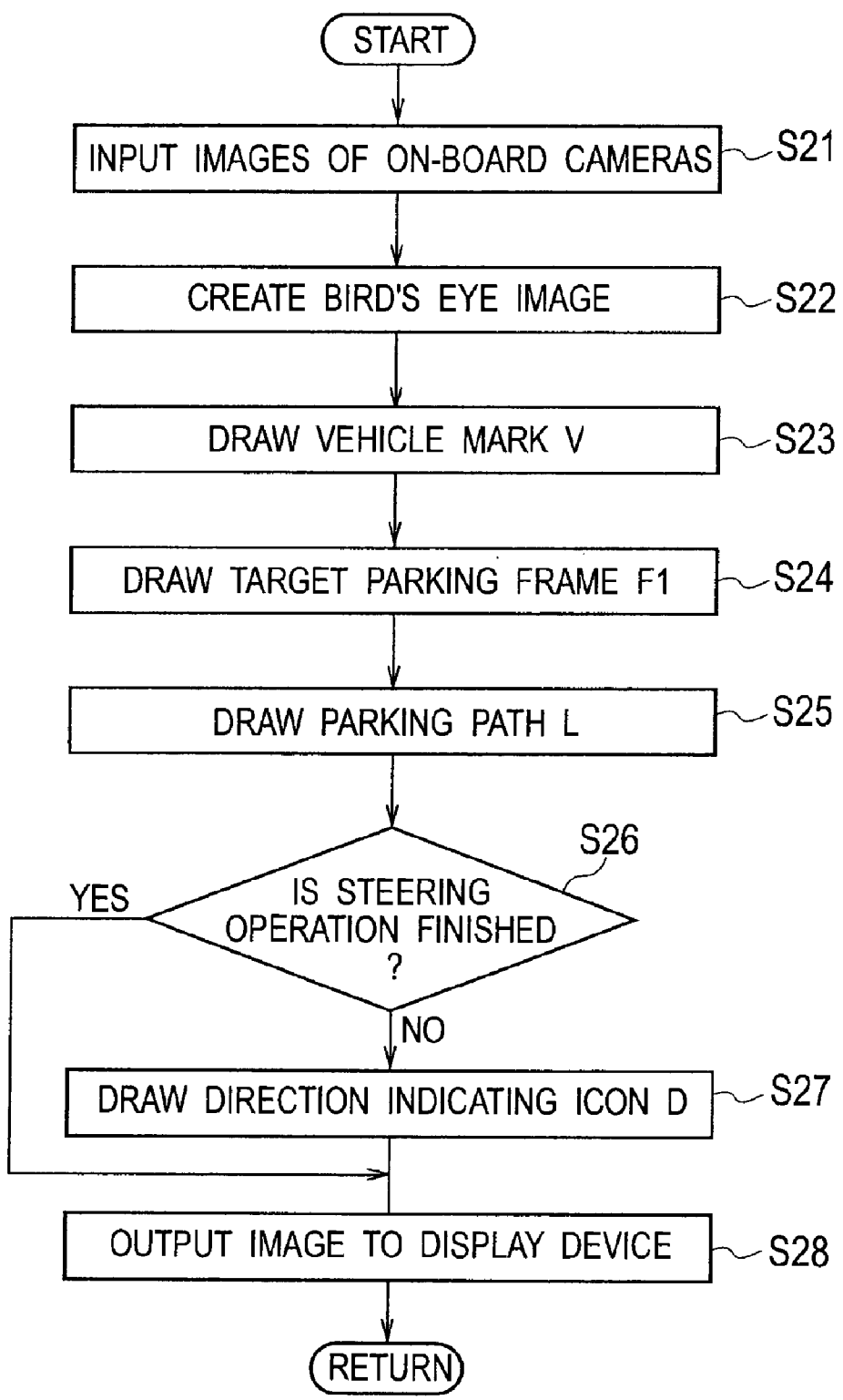
FIG. 10 is a flowchart of a flow of a series of processing steps executed by the image processing device for each predetermined cycle during a period from when the vehicle reaches the parking start position to when the vehicle reaches a target parking position.

Next, a description will be made of basic operations of the parking assistance apparatus of this embodiment while referring to FIG. 9 and FIG. 10. FIG. 9 is a flowchart showing a flow of a series of processing steps executed by the image processing device 10 for each predetermined cycle (for example, imaging cycle of the on-board cameras) during a period from when the parking assistance apparatus of this embodiment is activated to when the vehicle reaches the parking start position, and FIG. 10 is a flowchart of a flow of a series of processing steps executed by the image processing device 10 for each predetermined cycle (for example, imaging cycle of the on-board cameras) during a period from when the vehicle reaches the parking start position to when the vehicle reaches the target parking position.

When the parking assistance apparatus is activated, for example, by a switching operation by the driver of the vehicle, then as shown in FIG. 9, first, in Step S11, the images taken by the four on-board cameras which are the front camera 1, the rear camera 2, the right side camera 3 and the left side camera 4 are inputted to the image input unit 11 of the image processing device 10 and are stored in the frame memories. Next, in Step S12, the bird's eye image looking down on the entire periphery of the vehicle as the center from the virtual viewpoint above the vehicle is created by the bird's eye image creation unit 12 by using the images taken by these four on-board cameras, and is stored in the frame memory of the image output unit 13. Then, in Step S13, the vehicle mark V indicating the current position of the vehicle is drawn by the graphic form drawing unit 16 on the center position of the bird's eye image created in Step S12.

Next, in Step S14, it is determined whether or not the target parking position serving as the parking target of the vehicle is set by the parking position setting unit 14. If the target parking position is not set, then the processing proceeds to Step S19, where an image in which only the vehicle mark V is drawn on the bird's eye image is outputted to the display device 5 by the image output unit 13, and the outputted image is displayed on the display device 5.

Meanwhile, if the target parking position is set, then in Step S15, on the bird's eye image created in Step S12, the target parking frame F1 indicating the target parking position is drawn by the graphic form drawing unit 16. Next, in Step S16, by the parking start position setting unit 15, the parking start position from which the vehicle can start to reach the target parking position while maintaining the current steering angle of the vehicle is set on the course when the vehicle travels while maintaining the current steering angle of the vehicle. Then, in Step S17, by the graphic form drawing unit 16, the drawing color of the parking start frame F2 is selected in response to the recommended degree of the set parking start position, and the parking start frame F2 indicating the parking start position is drawn on the bird's eye image created in Step S12. Moreover, in Step S18, by the graphic form drawing unit 16, the track of the vehicle of the time when the vehicle moves from the parking start position to the target parking position while maintaining the predetermined steering angle is drawn as the parking path L on the bird's eye image created in Step S12. Then, in Step S19, by the image output unit 13, the image in which the vehicle mark V, the target parking frame F1, the parking start frame F2 and the parking path L are individually drawn on the bird's eye image is outputted to the display device 5, and the outputted image is displayed on the display device 5.

After the vehicle reaches the parking start position, as shown in FIG. 10, the images taken by the four on-board cameras which are the front camera 1, the rear camera 2, the right side camera 3 and the left side camera 4 are inputted to the image input unit 11 in Step S21. Then, in Step S22, by the bird's eye image creation unit 12, the bird's eye image is created from the images taken by these four on-board cameras. Then, by the graphic form drawing unit 16, in Step S23, the vehicle mark V indicating the current position of the vehicle is drawn on the center position of the bird's eye image created in Step S22, then in Step S24, the target parking frame F1 indicating the target parking position is drawn on the bird's eye image created in Step S22, and in Step S25, the parking path L to the target parking position is drawn on the bird's eye image created in Step S22.

Next, by the graphic form drawing unit 16, it is determined in Step S26 whether or not the steering operation at the parking (reversing) start position is finished. In the case where this steering operation is not finished, then in Step S27, by the graphic form drawing unit 16, the direction indicating icon D is further drawn on the bird's eye image drawn in Step S22. Then, in Step S28, by the image output unit 13, the image in which the vehicle mark V, the target parking frame F1, and the parking path L, and further, the direction indicating icon D in the case where the steering operation is not finished are individually drawn on the bird's eye image is outputted to the display device 5, and the outputted image is displayed on the display device 5.

As described above while mentioning the specific example, in accordance with the parking assistance apparatus of this embodiment, when the target parking position serving as the parking target of the vehicle is set, the parking start position from which the vehicle can start to reach the target parking position while maintaining the predetermined steering angle is set on the course when the vehicle travels while maintaining the current steering angle. Then, on the bird's eye image looking down on the entire periphery of the vehicle as the center from the virtual viewpoint above the vehicle, there are drawn the vehicle mark V indicating the current position of the vehicle, the target parking frame F1 indicating the target parking position, and the parking start frame F2 indicating the parking start position. Then, the image in which the vehicle mark V, the target parking frame F1 and the parking start frame F2 are drawn on the bird's eye image is displayed on the display device 5. At this time, the parking start frame F2 indicating the parking start position is displayed so that the position thereof can be changed on the bird's eye image in response to the change of the steering angle of the vehicle. Moreover, the drawing color of the parking start frame F2 is changed in response to the recommended degree of the parking start position. Hence, in accordance with this parking assistance apparatus, the driver can be allowed to easily and accurately recognize the optimum parking start position for parking the vehicle at the target parking position, and in particular, a driver who is unaccustomed to the driving can be effectively assisted in the driving operation of the time of parking the vehicle.

Moreover, in accordance with the parking assistance apparatus of this embodiment, the track of the vehicle of the time when the vehicle moves from the parking start position to the target parking position is drawn as the parking path L on the bird's eye image. Accordingly, the driver can be allowed to recognize in advance the course of the vehicle of the time when the vehicle actually travels toward the target parking position. For example, in the case where the parking path L overlaps an obstacle or the like displayed on the bird's eye image, the parking assistance apparatus urges the driver of the vehicle to change the parking start position and so on.

Moreover, in accordance with the parking assistance apparatus of this embodiment, when the vehicle reaches the parking start position, the direction indicating icon D indicating the direction of the steering operation required at the parking start position concerned is further drawn on the bird's eye image. Accordingly, the driver of the vehicle can be allowed to easily recognize the direction of the steering operation required at the parking start position, and can be more effectively assisted in the driving operation of the time of parking the vehicle. Note that, though the driver of the vehicle is allowed to recognize the direction of the steering operation required at the parking start position in such a manner that the direction indicating icon D is drawn on the bird's eye image in this embodiment, it is also effective to display such a message, for example, that says "steer rightward" on the display device 5 or to output the message concerned by voice in place of drawing the direction indicating icon D or in combination with drawing the direction indicating icon D.

Second Embodiment

Next, a description will be made of a second embodiment of the present invention while referring to FIG. 11 and FIG. 12.

Figure 11:
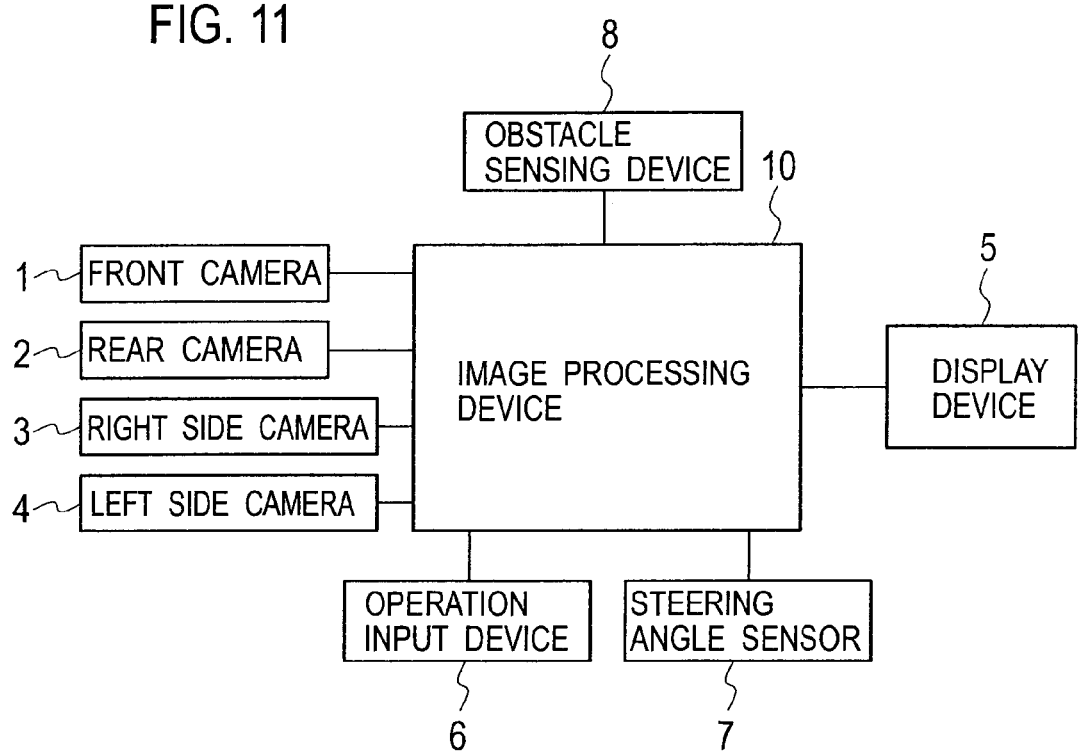
FIG. 11 is a block diagram showing a schematic configuration of the parking assistance apparatus added with an obstacle sensing device.

As shown in FIG. 11, a parking assistance apparatus of this embodiment is an apparatus, which connects an obstacle sensing device 8 that senses an obstacle around the vehicle to the image processing device 10, and determines the recommended degree of the parking start position, which is set in response to the current steering angle of the vehicle, by using information on the obstacle around the vehicle, which are sensed by the obstacle sensing device 8, thereby changes the drawing color of the parking start frame F2. Note that, since outlines of other configurations and processing are similar to those of the above-mentioned first embodiment, a description will be made only of portions intrinsic to this embodiment, and a description of portions duplicated with those of the first embodiment will be omitted.

The obstacle sensing device 8 is composed of, for example, an ultrasonic sensor that outputs an ultrasonic wave to the periphery of the vehicle and detects a reflected wave thereof. The obstacle sensing device 8 senses whether or not the obstacle is present around the vehicle, senses a distance of the vehicle to the obstacle and an orientation of the vehicle with respect to the obstacle, and outputs information on the sensed matter as obstacle information to the image processing device 10.

When the parking start position is set by the parking start position setting unit 15 based on the current steering angle of the vehicle, the graphic form drawing unit 16 of the image processing device 10 determines an interference possibility of the vehicle with the obstacle at the time of parking the vehicle by using the obstacle information from the obstacle sensing device 8, and changes the drawing color of the parking start frame F2 based on a result of such determination.

Figure 12:
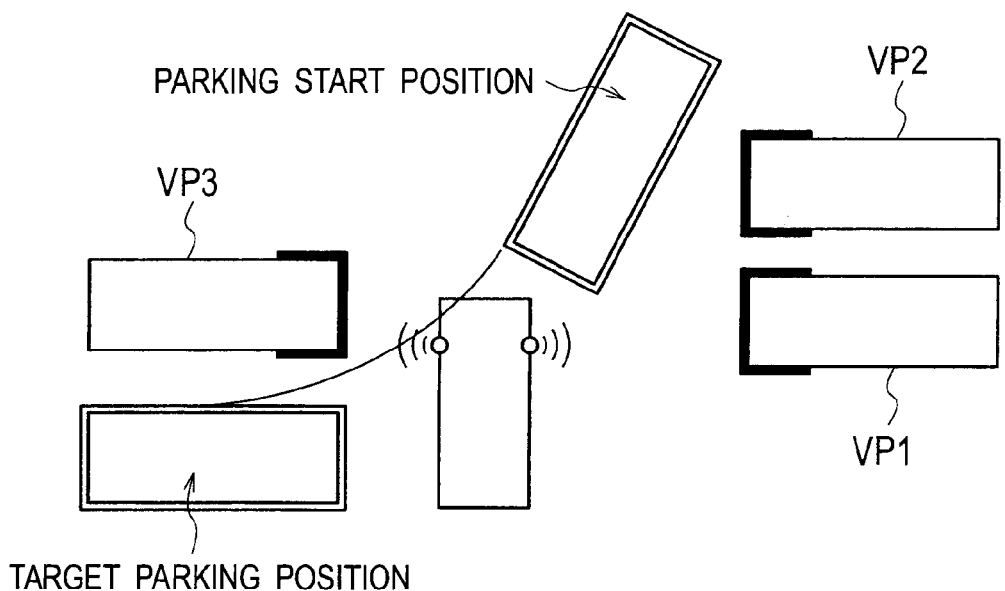
FIG. 12 is a schematic view showing a state of grasping relative positional relationships of obstacles present around the vehicle with respect to the target parking position by using obstacle information from the obstacle sensing device.

Specifically, for example as shown in FIG. 12, by using the obstacle information from the obstacle sensing device 8, the graphic form drawing unit 16 grasps relative positional relationships of such obstacles present around the vehicle with respect to the target parking position. Here, the obstacles are parked vehicles VP1 and VP2 parked at positions within the area E described in the first embodiment, a parked vehicle VP3 parked in the parking space adjacent to the target parking position, and the like. Then, in the case where the parking start position set by the parking start position setting unit 15 does not interfere with the obstacles such as the parked vehicles VP1 and VP2 sensed by the obstacle sensing device 8, and the path (track of the innermost turning circumference) from the parking start position to the target parking position does not interfere with the obstacle such as the parked vehicle VP3 sensed by the obstacle sensing device 8, then the graphic form drawing unit 16 draws the parking start frame F2 indicating the parking start position, for example, by green (first drawing color). Meanwhile, in the case where the parking start position set by the parking start position setting unit 15 interferes with the obstacles such as the parked vehicles VP1 and VP2 sensed by the obstacle sensing device 8, or the path (track of the innermost turning circumference) from the parking start position to the target parking position interferes with the obstacle such as the parked vehicle VP3 sensed by the obstacle sensing device 8, then the graphic form drawing unit 16 draws the parking start frame F2 indicating the parking start position, for example, by yellow (second drawing color).

Moreover, in a similar way to the first embodiment, in the case where the current steering angle of the vehicle is the steering angle in the direction of approaching the target parking position, and as shown in FIG. 7, the parking start position is set on the course Tc in the direction of approaching the target parking position, then the graphic form drawing unit 16 draws the parking start frame F2 indicating the parking start position concerned, for example, by red (third drawing color).

As described above, in accordance with the parking assistance apparatus of this embodiment, based on the interference possibility of the vehicle with the obstacles around the vehicle, which are sensed by the obstacle sensing device 8, the graphic form drawing unit 16 of the image processing device changes the drawing color of the parking start frame F2 indicating the parking start position set by the parking start position setting unit 15. Accordingly, the driver of the vehicle can be allowed to more accurately recognize the optimum parking start position from which the interference of the vehicle with the obstacles can be avoided.

Note that, though the example of using the ultrasonic sensor as the obstacle sensing device 8 has been illustrated in the above description, any device is adoptable as the obstacle sensing device 8 as long as the positions of the obstacles around the vehicle can be grasped thereby. Moreover, the obstacles around the vehicle may be sensed in such a manner that image processing for detecting objects from the images around the vehicle, which are taken by the on-board cameras 1 to 4, is performed in the image processing device 10 without using the obstacle sensing device 8 such as the ultrasonic sensor.

Third Embodiment

Next, a description will be made of a third embodiment of the present invention wile referring to FIG. 13.

This embodiment is a modification example of the above-mentioned second embodiment. In this embodiment, in the case where the path (track of the innermost turning circumference) from the parking start position to the target parking position interferes with the obstacle sensed by the obstacle sensing device 8, then the target parking position and the parking start position are reset to positions where the interference is avoided, and a parking start frame F2 indicating the reset parking start position is drawn by the first drawing color.

Figure 13:
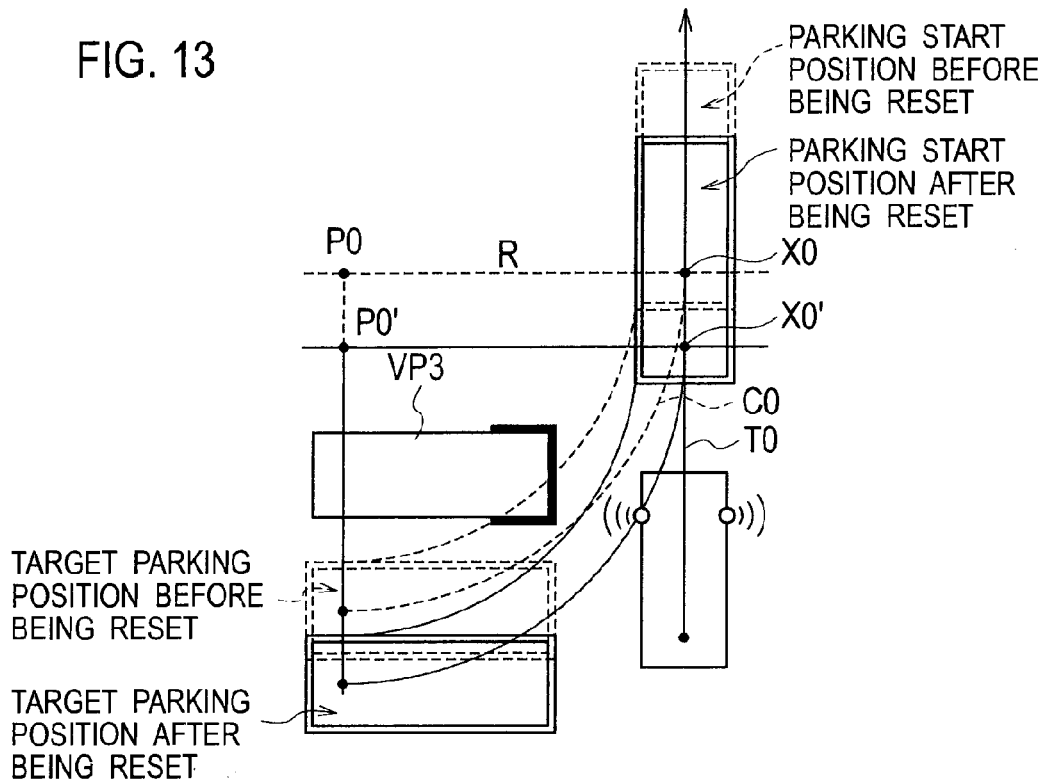
FIG. 13 is a view explaining an example of a method of resetting the target parking position and the parking start position in the case where a path from the parking start position to the target parking position interferes with the obstacle around the vehicle.

FIG. 13 is a view explaining a method of resetting the target parking position and the parking start position. Note that, here, for the sake of simplification, a description will be made of, taken as an example, the case where the current steering angle of the vehicle is 0°, and the target parking position and the parking start position are reset so that the path through which the vehicle reaches the target parking position from the parking start position while maintaining a state of making the full steering angle cannot interfere with the parked vehicle VP3 sensed by the obstacle sensing device 8.

In the case where the current steering angle of the vehicle is 0°, then as described by using FIG. 5 in the first embodiment, the parking start position from which the vehicle can reach the target parking position while maintaining the state of making the full steering angle becomes a position where the point of contact X0 is defined as the reference point. Here, the point of contact X0 is the point where the course T0 of the case where the steering angle is 0° contacts the circular arc C0 which has the radius R (radius of rotation of the case of making the full steering angle) and has the point P0 as a center of the arc. Here, the path (track of the innermost turning circumference) from the parking start position to the target parking position is obtained as a circular arc in which a radius is obtained by subtracting a length of an approximate half of a vehicle width from the radius of rotation R of the case of making the full steering angle. Accordingly, it is determined whether or not this obtained circular arc track interferes with the parked vehicle VP3 sensed by the obstacle sensing device 8. Then, in the case where the circular arc track interferes with the parked vehicle VP3, then the point P0 is moved to a point P0', about which the vehicle can turn so as to avoid the interference, in parallel along the direction of the course T0. Subsequently, the target parking position is moved in parallel along the direction of the course T0 in accordance with the movement of the center of the arc from the point P0 to the point P0', and the moved target parking position is reset as a new target parking position. Moreover, in accordance with the movement of the center of the arc from the point P0 to the point P0', the point of contact X0 is moved to a point of contact X0' in parallel, and the parking start position is reset to a position in which this point of contact X0' is defined as the reference point.

If the target parking position and the parking start position are set as described above, then the path (track of the innermost turning circumference) from the parking start position to the target parking position does not interfere with the parked vehicle V3 anymore. Accordingly, the graphic form drawing unit 16 of the image processing device 10 draws the parking start frame F2 indicating the reset parking start position, for example, by green (first drawing color) on the bird's eye image.

As described above, in accordance with the parking assistance apparatus of this embodiment, in the case where the path (track of the innermost turning circumference) from the parking start position to the target parking position interferes with the obstacles sensed by the obstacle sensing device 8, then the target parking position and the parking start position are reset to the positions where the interference is avoided, and the parking start frame F2 indicating the reset parking start position is drawn by the first drawing color. Accordingly, even in such a circumstance where the obstacles are present around the vehicle, the driver of the vehicle can be allowed to surely recognize the optimum parking start position from which the interference of the vehicle with the obstacles can be avoided, and the driver of the vehicle can be more appropriately assisted in the parking operation to the target parking position.

Fourth Embodiment

Figure 14:
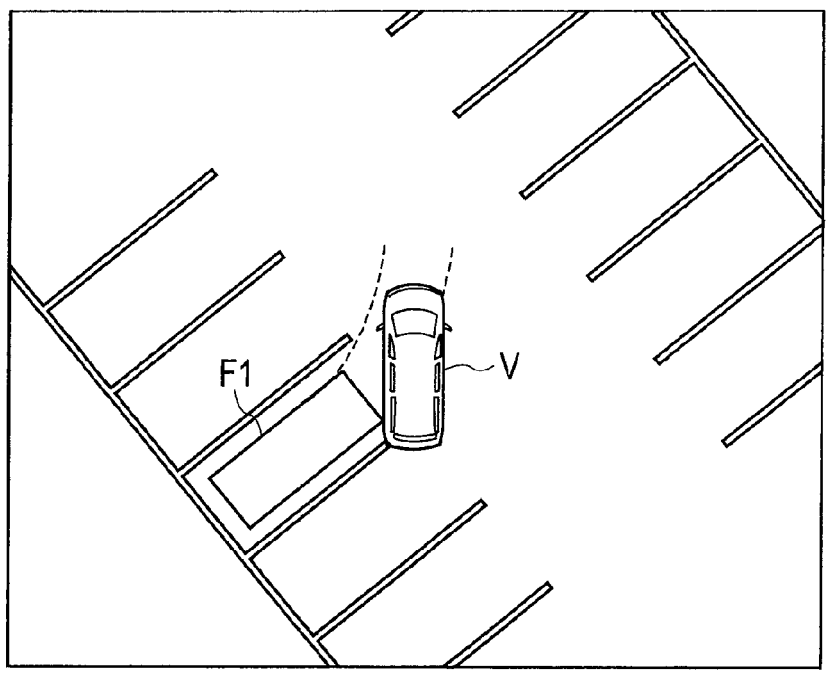
FIG. 14 is a view explaining a state where a course of the vehicle is positionally shifted from a parking path, showing an example of an image displayed on the display device in this case.
Figure 15:
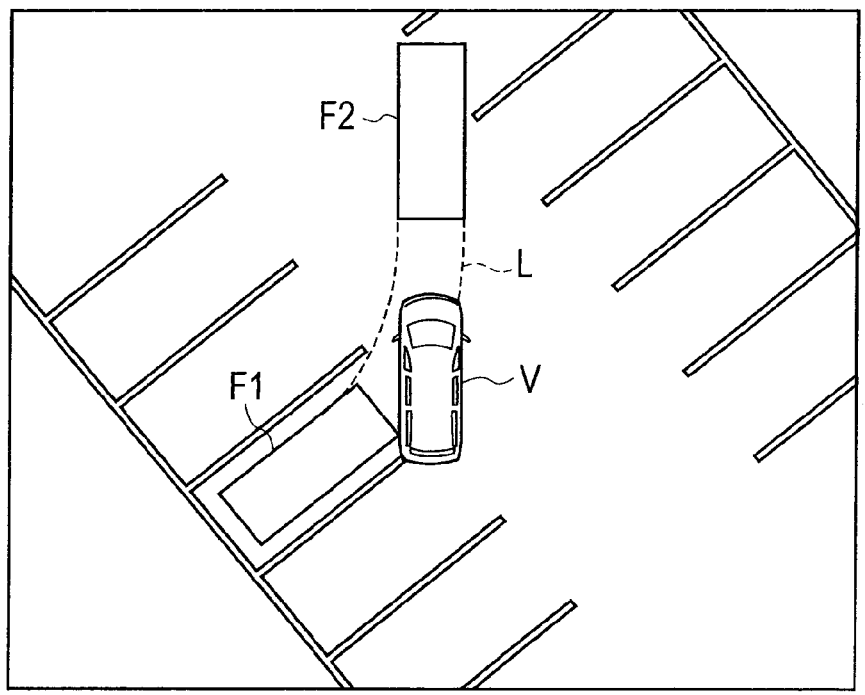
FIG. 15 is a view showing an example of an image displayed on the display device when the vehicle discontinues a parking operation.

Next, a description will be made of a fourth embodiment of the present invention while referring to FIG. 14 and FIG. 15.

In the first embodiment, it is premised that the vehicle moves along the parking path L from the parking start position to the target parking position, and when the vehicle reaches the parking start position, the drawing of the parking start frame F2 is ended. However, in the actual parking operation, it is also assumed that the driver performs the steering operation because of a sudden cause, and that the driver unconsciously performs the steering operation, and such a situation may occur that the course of the vehicle may be positionally shifted from the parking path L, resulting in that the vehicle cannot precisely reach the target parking position. In such a case, it may become sometimes necessary to temporarily discontinue the ongoing parking operation, to move the vehicle to a position from which the vehicle can precisely reach the target parking position, and then to resume the parking operation. Accordingly, in this embodiment, when it is determined that the parking operation of the vehicle is discontinued in a process where the vehicle moves from the parking start position to the target parking position, the setting of the parking start position and the drawing of the parking start frame F2 are resumed.

In a parking assistance apparatus of this embodiment, a function to determine the discontinuation of the parking operation, for example, based on stop, shift change and the like of the vehicle before the vehicle reaches the target parking position is added to the image processing device 10. Then, when the parking operation of the vehicle is discontinued, the parking start position setting unit 15 resumes the setting of the parking start position corresponding to the steering angle of the vehicle at that time, and the graphic form drawing unit 16 resumes the drawing of the parking start frame F2 indicating the newly set parking start position.

The description of this embodiment will be made while mentioning a specific example. It is assumed that, in a process where the vehicle moves along the parking path L, for example, from the state shown in FIG. 8 to the target parking position, the steering angle is changed because of some cause, and as shown in FIG. 14, the course of the vehicle is positionally shifted from the parking path L. At this time, when the driver of the vehicle stops the vehicle and performs the shift change, information indicating these stop and shift change is inputted to the image processing device 10, and it is determined that the parking operation of the vehicle is discontinued. Then, a parking start position corresponding to the current steering angle is set by the parking start position setting unit 15, and a parking start frame F2 indicating the parking start position concerned is drawn on the bird's eye image by the graphic form drawing unit 16.

Specifically, when it is determined that the parking operation of the vehicle is discontinued, then based on information on the current steering angle of the vehicle, which is sensed by the steering angle sensor 7, the parking start position setting unit 15 sets the parking start position, from which the vehicle can reach the target parking position while maintaining the predetermined steering angle, on the course when the vehicle travels while maintaining the current steering angle. Then, on the bird's eye image created by the bird's eye image creation unit 12, the graphic form drawing unit 16 draws the parking start frame F2 indicating the parking start position set by the parking start position setting unit 15. Note that, also in this case, as described in the first embodiment, the graphic form drawing unit 16 changes the drawing mode (for example, the drawing color) of the parking start frame F2 drawn on the bird's eye image in response to the recommended degree of the parking start position, which is set in response to the current steering angle of the vehicle.

Moreover, when such a new parking start position is set by the parking start position setting unit 15, the graphic form drawing unit 16 draws, on the bird's eye image, a new parking path L of the case where the vehicle moves from this new parking start position to the target parking position while maintaining the predetermined steering angle. In such a way, for example as shown in FIG. 15, the image in which the vehicle mark V, the target parking frame F1, the parking start frame F2 and the parking path L are individually drawn on the bird's eye image is displayed on the display device 5 one more time. Then, the driver of the vehicle can easily grasp the optimum parking start position while seeing the image displayed on the display device 5, and can simply perform the parking operation to the target parking position.

As described above, in accordance with the parking assistance apparatus of this embodiment, when the parking operation of the vehicle is discontinued, the parking start position setting unit 15 resumes the setting of the parking start position, and the graphic form drawing unit 16 draws the parking start frame F2 indicating the newly set parking start position on the bird's eye image. Accordingly, even in the case where the steering angle is changed because of some cause and the course of the vehicle going toward the target parking position is positionally shifted from the parking path L, the driver of the vehicle can be allowed to recognize to which position the driver should move to resume the parking operation in order to allow the vehicle to easily reach the target parking position. Then, the driver of the vehicle can be more effectively assisted in the driving operation of the time of parking the vehicle.

Fifth Embodiment

Figure 16:
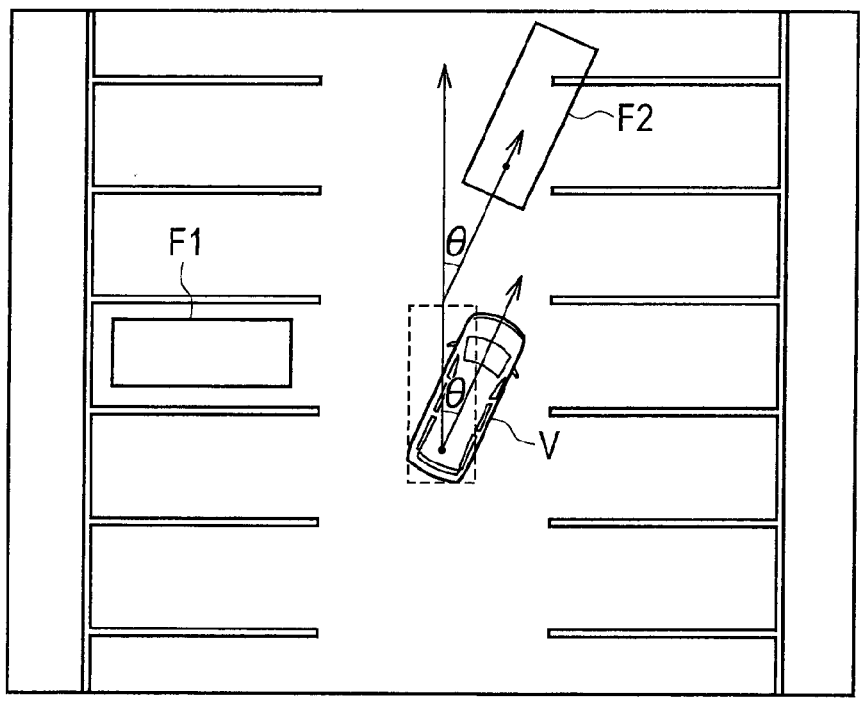
FIG. 16 is a view explaining an example of changing an orientation of a vehicle mark drawn on a bird's eye image in response to a current steering angle of the vehicle.

Next, a description will be made of a fifth embodiment of the present invention while referring to FIG. 16.

A parking assistance apparatus of this embodiment is an apparatus in which an orientation of the vehicle mark V drawn by the graphic form drawing unit 16 of the image processing device 10 on the bird's eye image is changed in response to the current steering angle of the vehicle. Note that, since outlines of other configurations and processing are similar to those of the above-mentioned first embodiment, a description will be made only of portions intrinsic to this embodiment, and a description of portions duplicated with those of the first embodiment will be omitted.

As mentioned above, when the bird's eye image is created by the bird's eye image creation unit 12, the graphic form drawing unit 16 of the image processing device 10 draws the vehicle mark V composed of the computer graphic image on the center position of the bird's eye image. Here, particularly in this embodiment, when the target parking position is set by the target parking position setting unit 14, and the parking start position corresponding to the current steering angle of the vehicle is set by the parking start position setting unit 15, the orientation of the vehicle mark V drawn by the graphic form drawing unit 16 is changed so as to coincide with the orientation of the vehicle when the vehicle reaches the parking start position while maintaining the current steering angle of the vehicle, that is, with the orientation of the parking start frame F2 on the bird's eye image. For example, as shown in FIG. 16, if the parking start frame F2 is inclined by an angle θ with respect to the current position of the vehicle, then the graphic form drawing unit 16 draws the vehicle mark V drawn on the bird's eye image so that the orientation thereof can be inclined by the angle θ with respect to the orientation of the vehicle.

As described above, in accordance with the parking assistance apparatus of this embodiment, when the target parking position and the parking start position are set, the orientation of the vehicle mark V drawn on the bird's eye image by the graphic form drawing unit 16 is changed in response to the current steering angle of the vehicle sc as to coincide with the orientation of the parking start frame F2. Accordingly, the driver of the vehicle can be allowed to more directly recognize that the vehicle reaches the parking start position displayed as the parking start frame F2 on the bird's eye image if the vehicle travels while maintaining the current steering angle thereof. Then, the driver of the vehicle can be more effectively assisted in the driving operation of the time of parking the vehicle.

Note that, though the drawing color is illustrated as the drawing mode of the parking start frame F2, which is changed in response to the recommended degree of the parking start position, in the first to fifth embodiments described above, other drawing modes such as a line thickness and line type of the parking start frame F2 may be changed in place of the change of the drawing color or in combination with the drawing color. Specifically, for example, the parking start frame F2 drawn by green in the above-mentioned respective embodiments is drawn by a thick line, the parking start frame F2 drawn by yellow therein is drawn by a medium thick line, and the parking start frame F2 drawn by red therein is drawn by a thin line. As described above, the thickness of the line of the parking start frame F2 is changed in response to the recommended degree of the parking start position. Alternatively, the parking start frame F2 drawn by green in the above-mentioned respective embodiments is drawn by a solid line, the parking start frame F2 drawn by yellow therein is drawn by a dotted line, and the parking start frame F2 drawn by red therein is drawn by an alternate long and short dashed line. As described above, the type of the line of the parking start frame F2 is changed in response to the recommended degree of the parking start position. Even in either of cases, similar effects to those in the above-mentioned respective embodiments can be obtained.

Moreover, though the parking start position is set on the premise that the vehicle moves from the parking start position to the target parking position while maintaining the state of making the full steering angle in the above-mentioned respective embodiments, the steering angle of the vehicle from the parking start position to the target parking position is not limited to the full steering angle, and is settable at an arbitrary steering angle.

Furthermore, the descriptions have been made of the respective embodiments on the premise that the movement of the vehicle from the current position to the parking start position, a steering turning operation at the parking start position, and the movement of the vehicle from the parking start position to the target parking position are performed by the driving operation of the driver of the vehicle; however, it is also possible to fully automatically move the vehicle and perform the steering turning operation by adding a function to output control commands to an engine ECU, a brake actuator, a steering actuator and the like.

The entire contents of a Japanese Patent Application No. P2008-191958 with a filing date of Jul. 25, 2008 in Japan are herein incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A parking assistance apparatus comprising:
    a plurality of on-board cameras which take images around a vehicle;
    a bird's eye image creation unit that synthesizes a plurality of the images taken by the plurality of on-board cameras to thereby create a bird's eye image looking down on the vehicle from above the vehicle; and
    a display device that displays the created bird's eye image, a target parking frame over the displayed bird's eye image, the target parking frame indicating a target parking position, and a parking start frame over the displayed bird's eye image independently from the tarot parking position, the parking start frame indicating a parking start position that is a position for starting a reverse running toward the target parking position,
    wherein a display position and drawing mode of the parking start frame are changed in response to a change of a steering angle of the vehicle.

2. The parking assistance apparatus according to claim 1, wherein the display position and drawing color of the parking start frame are changed in response to the change of the steering angle of the vehicle.

3. The parking assistance apparatus according to claim 1, wherein the drawing mode of the parking start frame is changed in response to a recommended degree of the parking start position, the recommended degree being set based on the steering angle of the vehicle.

4. The parking assistance apparatus according to claim 3, wherein, in a case where the parking start position is set at a position at which an entanglement amount in a width direction of the target parking position along a path to the target parking position becomes a predetermined value or less, and that does not interfere with an area apart from the target parking position in a longitudinal direction thereof by a predetermined distance or more, the parking start frame is drawn in a first drawing mode, and in a case where the parking start position is set at a position at which the entanglement amount in the width direction of the target parking position along the path to the target parking position exceeds the predetermined value, or at a position that interferes with the area apart from the target parking position in the longitudinal direction by the predetermined distance or more, the parking start frame is drawn in a second drawing mode different from the first drawing mode.

5. The parking assistance apparatus according to claim 3, further comprising:
    an obstacle sensing device that senses an obstacle around the vehicle,
    wherein, in a case where the parking start position does not interfere with the obstacle sensed by the obstacle sensing device, and a path from the parking start position to the target parking position does not interfere with the obstacle sensed by the obstacle sensing device, the parking start frame is drawn in a first drawing mode, and in a case where the parking start position interferes with the obstacle sensed by the obstacle sensing device, and the path from the parking start position to the target parking position interferes with the obstacle sensed by the obstacle sensing device, the parking start frame is drawn in a second drawing mode different from the first drawing mode.

6. The parking assistance apparatus according to claim 5, wherein, in the case where the path from the parking start position to the target parking position interferes with the obstacle sensed by the obstacle sensing device, the target parking position is changed, and the parking start position is reset in accordance with the changed target parking position, and
    in a case where the path from the parking start position to the target parking position does not interfere with the obstacle sensed by the obstacle sensing device anymore by resetting the parking start position, the parking start frame is drawn in the first drawing mode.

7. The parking assistance apparatus according to claim 4, wherein, in a case where the steering angle of the vehicle is in a direction of approaching the target parking position, and the parking start position is set on a course corresponding to the steering angle, the parking start frame is drawn in a third drawing mode different from the first and second drawing modes.

8. The parking assistance apparatus according to claim 1, wherein, when the vehicle reaches the parking start position, the display device further displays a direction indicating icon that indicates a direction of a steering operation at the parking start position.

9. The parking assistance apparatus according to claim 1, wherein drawing of the parking start frame is ended when the vehicle reaches the parking start position.

10. The parking assistance apparatus according to claim 9, wherein setting of the parking start position and drawing of the parking start frame are resumed when it is determined that the parking operation of a time when the vehicle moves from the parking start position to the target parking position is discontinued.

11. The parking assistance apparatus according to claim 1, wherein the display device further displays a vehicle mark indicating a position of the vehicle on the bird's eye image, and
    an orientation of the vehicle mark is changed in response to the change of the steering angle of the vehicle.

12. A parking assistance apparatus comprising:
    means for taking images around a vehicle;
    means for synthesizing a plurality of the images around the vehicle to thereby create a bird's eye image looking down on the vehicle from above the vehicle; and
    means for displaying the created bird's eye image, a target parking frame over the displayed bird's eye image, the target parking frame indicating a target parking position, and a parking start frame over the displayed bird's eye image independently from the target parking position, the parking start frame indicating a parking start position that is a position for starting a reverse running toward the target parking position,
    wherein a display position and drawing mode of the parking start frame are changed in response to a change of a steering angle of the vehicle.

13. A parking assistance method comprising:
    synthesizing a plurality of images around a vehicle, the images being taken by a plurality of on-board cameras, to thereby create a bird's eye image looking down on the vehicle from above the vehicle;

displaying, on a display device, the created bird's eye image, a target parking frame over the displayed bird's eye image, the target parking frame indicating a target parking position, and a parking start frame over the displayed bird's eye image independently from the target parking position, the parking start frame indicating a parking start position that is a position for starting a reverse running toward the target parking position; and changing a display position and drawing mode of the parking start frame in response to a change of a steering angle of the vehicle.

* * * * *